CORE MATRIX PLANE

Filed July 29, 1968

INVENTORS
SEIHIN KOBAYASHI
MICHIHIRO TORII
HIROICHI SAKODA
BY Eliot S. Gerber
ATTORNEY United States Patent Office
3,518,644
Patented June 30, 1970

3,518,644

CORE MATRIX PLANE

Seihin Kobayashi, Michihiro Torii, and Hiroichi Sakoda, Washizu, Shizuoka Prefecture, Japan, assignors to Fuji Denki Kagaku Kabushiki Kaisha, Tokyo, Japan, a corporate body of Japan Filed July 29, 1968, Ser. No. 748,506
Claims priority application Japan, Dec. 6, 1967, 42/101,962
Int. Cl. G11c *5/02, 5/08, 11/06*
U.S. Cl. 340—174 7 Claims

ABSTRACT OF THE DISCLOSURE

A memory storage device for computers and information retrieval systems includes a frame in which vertical Y wires are crossed with horizontal X wires and two sense wires. Annular shaped bistable ferrite cores are threaded by the X and Y wires at their cross-points. The sense wires are threaded at substantially right angles to each other, through the memory cores, forming diagonal wiring. The sense wire in one direction is strung above the X, Y and inhibit wires and the sense wire in the other direction is strung below them.

The present invention relates to electronic computers and more particularly to the winding of the sense wires in a magnetic memory core matrix.

Electronic computers and information retrieval systems may be provided with a variety of data storage devices, depending upon the speed and size desired. A fast storage device is the magnetic memory core wire matrix which uses as non-linear (bistable) magnetic core elements, a doughnut (annular) shaped ferrite ceramic material. Each core element does not change its state when a half current is passed through it, but changes its state when a full current is applied. A specific core is energized by selecting the horizontal X wire and the vertical Y wires through the core, each wire carrying a half current. The cores on the X and Y coordinates which are linked by only a half current will not change state, but the core at the intersection of the wires receives the full current and changes its state.

When the X and Y wires of a magnetic element are simultaneously energized, the "write"occurs and the coincidence current is sufficient to change the magnetic state of that core element. The cores are linked by two sense windings. The flux change resulting from a core being forced from the one magnetic state to its state induces a voltage in the sense wire. This voltage is detected by suitable amplifiers connected to the terminals of the sense wires.

The core matrix plane comprises a plurality of annular memory cores arranged in the form of a matrix in a frame. The sense wires, the X and Y wires and, as required, inhibit wires, are threaded according to a fixed rule into each annular memory core.

In a conventional prior art magnetic memory core matrix the X and Y wires were threaded, at right angles to each other, through each of the annular cores. The first sense wire was then threaded through the cores on top of the X and Y wires. The second sense wire was then threaded through the cores on top of the first sense wire and at a right angle to the first sense wire. The sense wires were advanced over each other and contacted one another.

The memory cores are small because of the requirements of making the apparatus smaller and making the calculating velocity higher. The cores are so small that the inside diameter of the core is often limited so that it is smaller than 12 mils. For the same reasons, the distance between adjacent cores is also made shorter. On the other hand, it is desirable that the diameters of the above-mentioned wires which are threaded through the cores to be as thick as possible in order to obtain a high output.

Under such circumstances, the wire stringing operation for threading three or four wires through each fine memory core has been very troublesome. Also, either one of the sense wires has had to be advanced over the other sense wire at each intersection and therefore the efficiency of the wire stringing operation has been very low.

Further, usually a hard wire for piloting is provided at the tip of each of the wires for insertion into the core to facilitate the wire stringing operation. However, such hard wire tips may collide with the wire over which it should pass and may hurt the insulating film of that wire. As a result, there have been experienced the inconveniences and the disadvantages that the wire rusts and the electric insulation deteriorates.

A main objective of the present invention is therefore to provide a core matrix plane wherein sense wires can be straightly advanced into memory cores and strung so that the insulative film of the wire may not be hurt with the tip of a hard piloting wire and the wires may be strung at a high operating efficiency.

According to the present invention a sense wire is threaded so that it passes at right angles through a group of memory cores arranged in the same direction. A second sense wire is threaded so that it passes at right angles through another group of memory cores arranged in a direction intersecting substantially at right angles with the above-mentioned group of memory cores. The two sense wires are arranged in different and spaced planes. That is to say, both the sense wires are arranged to be included in different planes occupying relative respective positions above and below the X wires, Y wires and inhibit wires. The inhibit wires may be, for example, parallel to the X wires.

In the structure of the present invention, both sense wires are solidly arranged so as never to contact each other in any intersection. So long as the cores are accurately arranged, the sense wire may be straightly strung from core to core and the difficulties of advancing one sense wire over the other can be eliminated. Therefore, irrespective of the degree of skill, an operator can perform the wire stringing operation easily and efficiently. Further, in the wire stringing operation, the wire film is prevented from being hurt by the tip of the hard wire.

For a better understanding of the invention, as well as further objectives and features thereof, reference is made to the following detailed description to be read in conjunction with the accompanying drawings wherein like figures are represented by like reference numerals.

Figure 1:
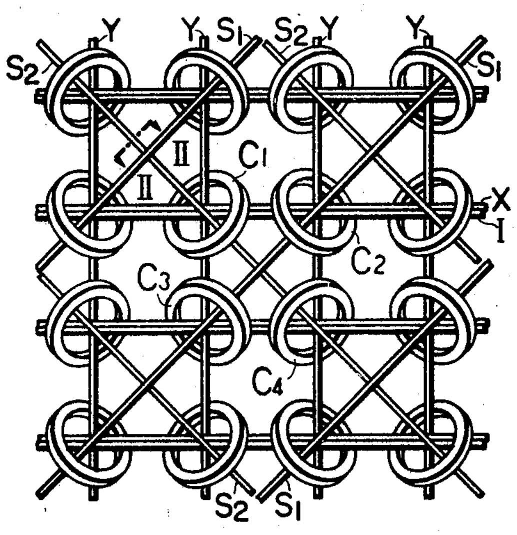
FIG. 1 PRIOR ART
FIG. 1 is an explanatory perspective view showing an essential part of a conventional prior art core matrix plane.
Figure 2:
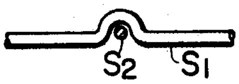
FIG. 2 PRIOR ART
FIG. 2 is a sectioned side view taken on line II–II in FIG. 1, as seen in the direction indicated by the arrows.
Figure 4:
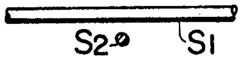
FIG. 4 is a sectioned side view taken on line IV—IV in FIG. 3 as seen in the direction indicated by the arrows.

FIG. 1 shows a conventional prior art example of stringing a core matrix plane. Respective wires are represented by the sign X, inhibit wires are represented by the sign I, the I wires being parallel to the X wires, and the Y wires are represented by the sign Y. The two sense wires are represented by the signs $S_1$ and $S_2$ and are strung in respectively different planes. The sense wires $S_1$ and $S_2$ are threaded at right angles to each other within each core. The annular memory cores $C_1$, $C_2$ and $C_3$, $C_1$ have directions intersecting at right angles with each other. It is found that, at each intersection were either one sense wire, for example $S_1$, necessarily intersects with the other sense wire, for example, $S_2$, as evident from FIG. 2, the wire $S_1$ must be advanced over and contact the other wire $S_2$.

Figure 3:
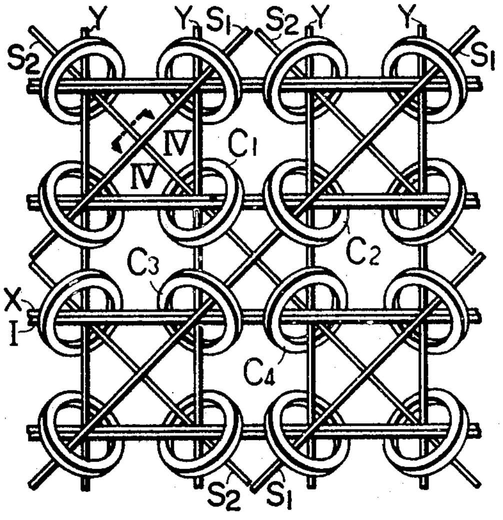
FIG. 3 is an explanatory perspective view, corresponding to FIG. 1 and showing an essential part of a core matrix plane according to the present invention.

The present invention is illustrated in FIG. 3. In FIG. 3 a sense wire $S_1$ threads at about a right angle memory cores $C_2$ and $C_3$ arranged in the same direction. Another sense wire $S_2$ threads, at about a right angle, memory cores $C_1$ and $C_4$. Sense wire $S_2$ is threaded in a direction intersecting at right angles with the direction of the axis of memory cores $C_2$ and $C_3$ and with sense wire $S_1$. These two sense wires, $S_1$ and $S_2$, are strung to form diagonal wiring to hold X number of wires X, Y number of wires Y and inhibit wires I. The X, Y and I wires are included respectively in quite different planes above and below the sense wires $S_1$ and $S_2$, i.e., the Y, X and I wires are positioned between sense wire $S_1$ and sense wire $S_2$. As shown, a group of four cores may be inclined toward each other so that their axis has a common finite meeting point.

Figure 5:
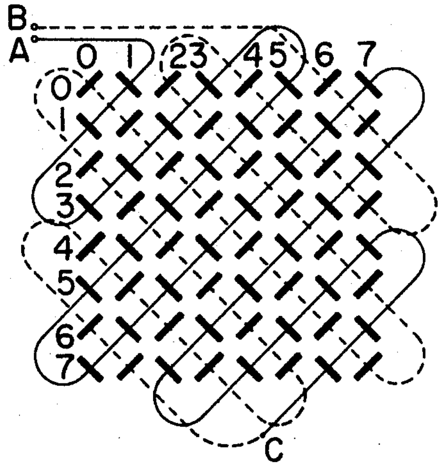
FIG. 5 is a top plan view of an embodiment of the present invention in which only sense wire windings are applied to a matrix plane having 8 x 8 annular arranged memory cores.

FIG. 5 shows a core matrix plane having 8 x 8, i.e., 64 memory cores and embodying the present invention. The solid line starting to be strung at the sign A and threaded from the core in the position of (0–1), arranged in the same direction and through cores to the position of (7–6) in turn is a sense wire corresponding to $S_1$ in FIG. 3, that is, it is positioned above the X and Y wires and inhibit I wires. Then, from the sign C, which is the terminal of the solid line, another sense wire (shown by the dotted line) is positioned below the X and Y driving wires and inhibit I wires. This second sense wire corresponds to $S_2$ in FIG. 3 and is strung from the core in the position of (7–1), through cores to the position of (0–6) and ends at the sign B.

In such case, when the sense wire $S_1$ positioned above has been completely strung, if the surface of the core matrix is turned over, the wire strung in the cores will move downward and thus forming a clearance for threading the sense wire $S_2$, which is strung next. In this manner it is very easy and positive to string the sense wires above and below the X and Y wires and inhibit wires.

The illustrated embodiment utilizes inhibit wires. However, it is needless to say they can be eliminated, depending on the driving mode. In such case, the sense wires will be strung above and below the X and Y wires so as to hold them.

In this invention, various changes in the size and shape of the different parts, as well as modifications and alterations, may be made within the scope of the appended claims.

What is claimed is:

1. A core matrix plane comprising a frame, a plurality of memory cores arranged in the form of a matrix in said frame, an X wire and a Y wire threaded through each of said memory cores, and first and second sense wires classified in two directions threaded through the said memory core, in which matrix said first sense wire in one direction is strung on one side of said X and Y wires and said second sense wire in the other direction is strung on the opposite side of said X and Y wires.

2. A core matrix plane as in claim 1 and also including an inhibit wire threaded through each of said memory cores and within the cores sandwiched between said first and second sense wires.

3. The core matrix plane as in claim 2 wherein said inhibit wire is parallel to said X wire and/or Y wire.

4. The core matrix plane as in claim 1 wherein said first and second sense wires are strung forming a diagonal.

5. The core matrix as in claim 4 wherein said first and second sense wires are at substantially right angles to each other.

6. The core as in claim 5 wherein the X and Y wires are at substantially right angles to each other and their angles to the said sense wires are substantially 45°.

7. The core matrix as in claim 1 wherein the axis of each group of four cores has a common meeting point.

References Cited

UNITED STATES PATENTS 2,778,005 1/1957 Allen -------------- 340—174

JAMES W. MOFFITT, Primary Examiner